No. 659,557. Patented Oct. 9, 1900.
U. P. SMITH.
PNEUMATIC TIRE FOR VEHICLES.
(Application filed Jan. 24, 1900.)

(No Model.)

Witnesses.
Robert Garrett.
Albry S. W. DeLaw.

Inventor.
Uzziel P. Smith.
By James L. Norris.
Atty.

THE NORRIS PETERS CO., PHOTO-LITHO., WASHINGTON, D. C.

UNITED STATES PATENT OFFICE.

UZZIEL P. SMITH, OF CHICAGO, ILLINOIS, ASSIGNOR OF ONE-HALF TO THOMAS KANE, OF SAME PLACE.

PNEUMATIC TIRE FOR VEHICLES.

SPECIFICATION forming part of Letters Patent No. 659,557, dated October 9, 1900.

Application filed January 24, 1900. Serial No. 2,639. (No model.)

*To all whom it may concern:*

Be it known that I, UZZIEL P. SMITH, a citizen of the United States, residing at Chicago, in the county of Cook and State of Illinois, have invented new and useful Improvements in Pneumatic Tires for Vehicles, of which the following is a specification.

My invention relates to pneumatic tires for vehicles, and particularly to that form of tire employing an inner air-tube and an outer separable casing therefor; and it is the object of the invention to provide improved means for detachably securing said outer casing to the rim of the wheel.

To this end the invention resides in the features of construction and combination or arrangement of parts hereinafter described, and particularly pointed out in the claims.

In the use of tires of the character indicated as at present constructed and in connection with both bicycles and vehicles of a larger description it is found that the tire will frequently blow off of the rim if inflated beyond a given point or will wrench or work off if allowed to become slightly deflated, as they depend very largely upon inflation for their secure connection with the rim. In tires in which this objection has to some extent been overcome it is found that the tires cannot be readily removed from or attached to the rim, as is necessary for making repairs, and the constructions are otherwise unsatisfactory and costly. I aim by my invention to provide a tire which can be readily attached to or removed from the rim, which cannot be blown off when once secured in place, and which will remain on the rim should the tire become deflated. These objects I attain by the construction illustrated in the accompanying drawings, in which—

Figure 1:
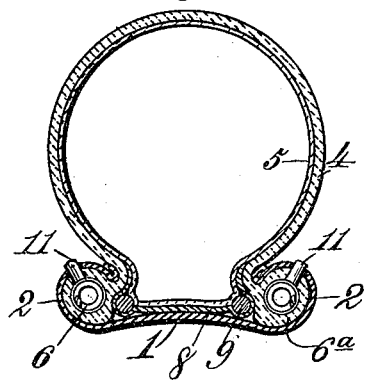
Figure 2:
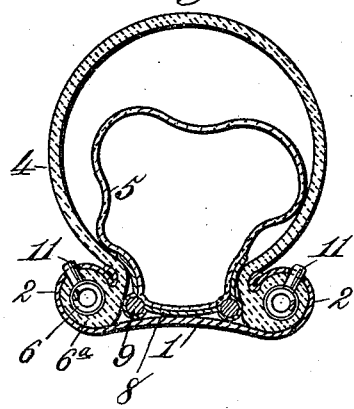
Figure 3:
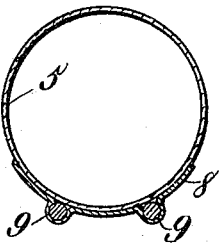
Figure 4:
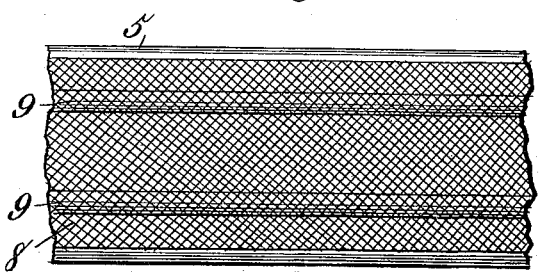
Figure 5:
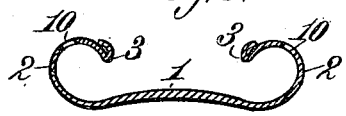
Figure 6:
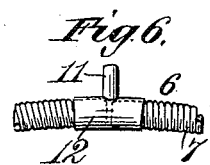
Figure 7:
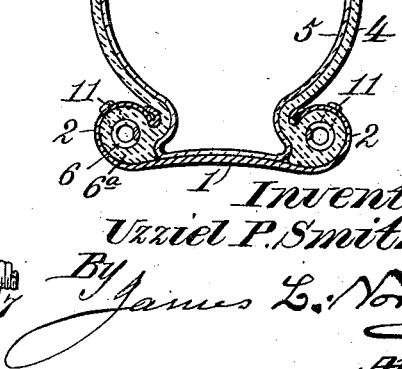

Figure 1 is a section through a tire and rim constructed according to my invention, the tire being inflated. Fig. 2 is a similar view, the tire being deflated. Fig. 3 is a similar view of the inner air-tube. Fig. 4 is a bottom plan view of a section of said tube. Fig. 5 is a section through the rim which I employ in connection with my invention. Fig. 6 is a view of a section of a coiled-wire ring, one of said rings being secured in each edge of the outer casing; and Fig. 7 is a section through a rim and tire, the tire being inflated and the inner air-tube being of the ordinary construction.

The numeral 1 indicates the rim, having its sides curved upwardly and inwardly to form the hooked flanges 2, which may have their edges rounded, as shown at 3.

The numeral 4 indicates the outer casing of the tire, and 5 the inner air-tube. Secured in each edge of the outer casing is a coiled-wire ring 6, a section of which is shown in Fig. 6. The manner of securing these rings in the casing is by wrapping the canvas or canvas and rubber thereof about the rings and then fastening the same, as by cementing or stitching. The material surrounding the wire rings 6 is indicated by $6^a$ and forms a thick annular pad, entirely filling the space beneath the hooks 2 and affording a bearing-surface against which the tube presses under inflation with sufficient force to keep the upper portion of this pad under and firmly against the inner surface of the hooks 2. The coils 7 of the wire 6 lie close together or in contact, so that while these rings are extensible and will readily permit the casing to be passed over the rim they are not compressible—that is, the diameter of the rings cannot be decreased without crushing the coils—nor after being placed upon the rim can they be extended, except in the manner hereinafter described. This construction of ring subserves an important purpose, which will presently be explained. These coiled-wire rings, while very elastic, have a strong spring and require a strong pull to extend them, so that the moment the strain is released the recoil is practically instantaneous. These rings can of course be made of any required sectional diameter and of any strength. They can be slipped over the rim with comparative ease and be readily inserted beneath the flanged hooks 2, by reason of their pliable character, and will require the exercise of considerable force at some one point to remove them from beneath the hooks, after which they can be worked over the rim and removed.

The wire rings, with the surrounding casing $6^a$, of rubber and canvas or cloth only, forms what I will term a "bead." In order to secure the full benefit from this style of bead, the wires should be coiled of sufficient diameter to fill and press firmly against every portion of the concave surface of the hooks when covered with the necessary retaining-cloth or cover 6ª. Heretofore, so far as I am aware, all beads made to retain a tire upon a rim in conjunction with the air-pressure have been made of material elastic and extensible in its nature or of rigid continuous rings, with special means provided outside the beads to permit them to be placed and held in position. Those beads made of material elastic and extensible in its nature, such as rubber and cloth, if subjected to a high lateral pressure will lengthen and loosen upon the rim and buckle, and by use they naturally become somewhat lengthened. This characteristic is fatal to the successful operation of any bead used to retain a vehicle-tire upon the rim in conjunction with the pressure produced by the inflation of the tire. A lateral crushing strain upon a strip or bead made of material that is in itself elastic and extensible if left free to act reduces it in size, but increases its length. If the crushing strain is longitudinal, the material becomes thicker and shorter. If such a strip or bead is made in the form of an annulus and so confined on the rim that it is impossible for it to lengthen, it will be compressed and will buckle under the pressure. This will of course be upon the side offering the least resistance, which is the side exposed to the air-tube, as said tube is flexible and will give way at some point to the strain exerted by the material in an attempt to relieve itself from the pressure. In an ordinary bicycle-tire, where the air-pressure rarely exceeds thirty pounds to the square inch, this may not be of much importance; but in tires for heavy vehicles, where in many cases an air-pressure is required of one hundred pounds and upward to the square inch, this feature becomes of the utmost importance, and a bead to withstand this strain must be so constructed that it is practically inextensible and unelastic when on the rim and is not effected by a crushing strain from any direction. These characteristics are possessed by the beads constructed according to this invention. In their normal condition these beads cannot be compressed or lessened in circumference either by a longitudinal crushing strain or by lateral pressure short of that sufficient to crush the coils, and it cannot be increased in circumference by any lateral strain or otherwise than by a direct longitudinal pull. When in position on the rim, whether in its normal condition or stretched, so that the coils are separated from each other, the beads can neither be lengthened nor diminished in circumference by any strain whatever, as if stretched the rim keeps the coils separated from each other and if unstretched the coils cannot be pressed close together, and no strain, therefore, upon the bead will bring the coils in contact or lessen the circumference of the bead which is not sufficient to crush the coils themselves. Hence the beads can never become loose upon the rim, but under all conditions they will cling to the rim and be held firmly against the surface of the hooks, while the air-pressure in the tube will force the beads outwardly against the outer concave surface of the hooks and keep their upper surface firmly within the upper concave surface thereof and above their edges, where the diameter is less than that of the hooks at the upper concave surface. This renders it impossible to force the beads as a whole from the hooks, as they cannot be compressed to a circumference equal to or less than that of the hooks at their edges. In other words, these beads offer the same resistance to removal from the rim that a bead with a continuous solid wire core would and possesses the same quality of incompressibility under lateral or crushing pressure, while they have the advantage over such a bead of being when off the rim extensible, pliable, and highly elastic. The outer casing as thus constructed may be made to inclose an air-tube of the ordinary construction and the resulting tire will possess all the advantages above enumerated. In order, however, to provide additional means for securely retaining the wired edges of the casing within the hooked flanges, I cover that portion of the inner air-tube 5 that lies next the seat of the rim with muslin, cloth, or other fabric 8 possessing considerable lateral give or stretch or cut on the bias, so as to possess this property, or I may employ rubber for this purpose. Within this fabric or between it and the tube I form two small elastic and extensible beads or ridges 9, somewhat nearer together than the distance between the edges of the hooks of the rim. These beads or ridges lie along the bottom of the rim and as the tube is inflated they are pressed apart and outwardly against the beads in the edges of the casing and prevent them from coming out of the recesses beneath the hooks. The cloth or other lining 8 extends a short distance beyond the beads or ridges 9, so as to come a little above the flanges of the rim. It will be seen that the more the air-tube is inflated the harder the beads or ridges 9 will press against the beads of the casing. This construction operates to keep the tube always in the same position on the rim, which is very important in tires employing tubes having a puncture-closing tread.

In order to prevent the tire from "creeping" upon the rim, which action is liable to injure the valve by tearing or partly tearing it from the tire, I provide hooks 2, with one or more apertures 10, which are designed to receive studs 11, one or more of which is carried by each ring 6, according to the number of apertures in the hooks of the rim. A convenient way of providing the rings 6 with these studs is to secure opposite ends of each ring by solder or otherwise in opposite ends of a tubular thimble 12, as shown in Fig. 6, said thimble having the stud 11 cast integral therewith. The stud 11 projects through and beyond the side of each bead 6ª and may be readily inserted in the aperture 10 when the tire is placed on the rim, and will thus prevent longitudinal movement of the tire upon the rim.

Having thus fully described my invention, what I claim as new is—

1. A pneumatic tire, comprising an inner air-tube, and an outer separable casing therefor having an elastic, non-compressible, coiled-wire ring secured in each of its edges, substantially as described.

2. A pneumatic tire comprising an inner air-tube, and an outer separable casing therefor having an elastic coiled-wire ring secured in each of its edges, the coils of said ring being normally in contact, whereby to render said ring non-compressible, substantially as described.

3. A pneumatic tire, comprising an inner air-tube provided along its seat portion with two parallel elastic and extensible beads or ridges, in combination with an outer separable casing having each of its edges provided with an elastic bead, substantially as described.

4. A pneumatic tire, comprising an inner air-tube provided along its seat portion with two parallel elastic and extensible beads or ridges, in combination with an outer separable casing having secured in each of its edges an elastic, non-compressible, coiled-wire ring, substantially as described.

5. In combination with a rim provided with annular flanged hooks, an inner air-tube and an outer separable casing therefor having secured in each of its edges an elastic, non-compressible, coiled-wire ring adapted to lie beneath said flange-hooks, substantially as described.

6. In combination with a rim having annular flanged hooks, an inner air-tube provided along its seat portion with two parallel elastic and extensible beads or ridges, and an outer separable casing therefor having each of its edges provided with an elastic bead adapted to seat under said flanged hooks, substantially as described.

7. In combination with a rim having flanged hooks, an inner air-tube provided along its seat portion with two parallel beads or ridges located normally at a less distance apart than the distance between the edges of said flanged hooks, and an outer separable casing therefor having each of its edges provided with an elastic bead adapted to seat under said flanged hooks, whereby upon the inflation of the inner air-tube, said beads or ridges will be pressed apart and into contact with the beads of said outer casing, substantially as and for the purpose described.

In testimony whereof I have hereunto set my hand in presence of two subscribing witnesses.

UZZIEL P. SMITH.

Witnesses:
D. R. BAHAN,
M. E. DEGRAFF.